US012700806B2

(12) United States Patent
Marwali et al.

(10) Patent No.: US 12,700,806 B2
(45) Date of Patent: Aug. 4, 2026

(54) DUAL ACTIVE BRIDGE CONTROL FOR THERMAL MANAGEMENT

(71) Applicant: Rivian IP Holdings, LLC, Irvine, CA (US)

(72) Inventors: Mohammad Nanda R. Marwali, Irvine, CA (US); Zahra Mohajerani, Los Angeles, CA (US); Vishnu Mohan, Long Beach, CA (US); Vishnu Narayan Vipin, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 172 days.

(21) Appl. No.: 18/809,011

(22) Filed: Aug. 19, 2024

(65) Prior Publication Data

US 2026/0051810 A1 Feb. 19, 2026

(51) Int. Cl.
H02M 3/335 (2006.01)
H02M 1/00 (2006.01)
H02M 1/32 (2007.01)

(52) U.S. Cl.
CPC ..... H02M 3/33573 (2021.05); H02M 1/0058 (2021.05); H02M 1/327 (2021.05); H02M 3/33576 (2013.01); *H02M 3/33584* (2013.01)

(58) Field of Classification Search
CPC ............. H02M 1/0054; H02M 1/0058; H02M 3/33569; H02M 3/33573; H02M 3/33576; H02M 3/33584; H02M 1/327
See application file for complete search history.

(56) References Cited

U.S. PATENT DOCUMENTS

| | | | | |
|---|---|---|---|---|
| 2016/0303987 | A1* | 10/2016 | Kawamura | B60L 53/20 |
| 2025/0105726 | A1* | 3/2025 | Opina, Jr. | H02M 1/38 |
| 2025/0350210 | A1* | 11/2025 | Sarda | H02M 1/0054 |

OTHER PUBLICATIONS

Gong, et al., "A Dynamic ZVS-Guaranteed and Seamless-Mode-Transition Modulation Scheme for the DAB Converter That Maximizes the ZVS Range and Lowers the Inductor RMS Current," IEE Transactions on Power Electronics, vol. 37, No. 11, (2022).

Yan et al., "Securing Full-Power-Range Zero-Voltage Switching in Both Steady-State and Transient Operations for a Dual-Active-Bridge-Based Bidirectional Electric Vehicle Charger," IEEE Transactions on Power Electronics, vol. 35, No. 7 (Jul. 2020).

* cited by examiner

*Primary Examiner* — Alex Torres-Rivera
(74) *Attorney, Agent, or Firm* — HG LAW LLP

(57) ABSTRACT

A system includes four primary-side switches of a primary bridge of a dual active bridge (DAB) converter, four secondary-side switches of a secondary bridge of the DAB converter, and control circuitry configured to operate the DAB converter in a first mode, where all of the four secondary-side switches operate under zero voltage switching (ZVS) and less than all of the four primary-side switches operate under ZVS, and, in response to a thermal condition, operate the DAB converter in a second mode, where less than all of the four secondary-side switches operate under ZVS and all of the four primary-side switches operate under ZVS. A method includes operating the control circuitry of the system to implement the first and second modes. In some embodiments, the control circuitry toggles between the first and second modes based on one or more thermal conditions.

20 Claims, 7 Drawing Sheets

700

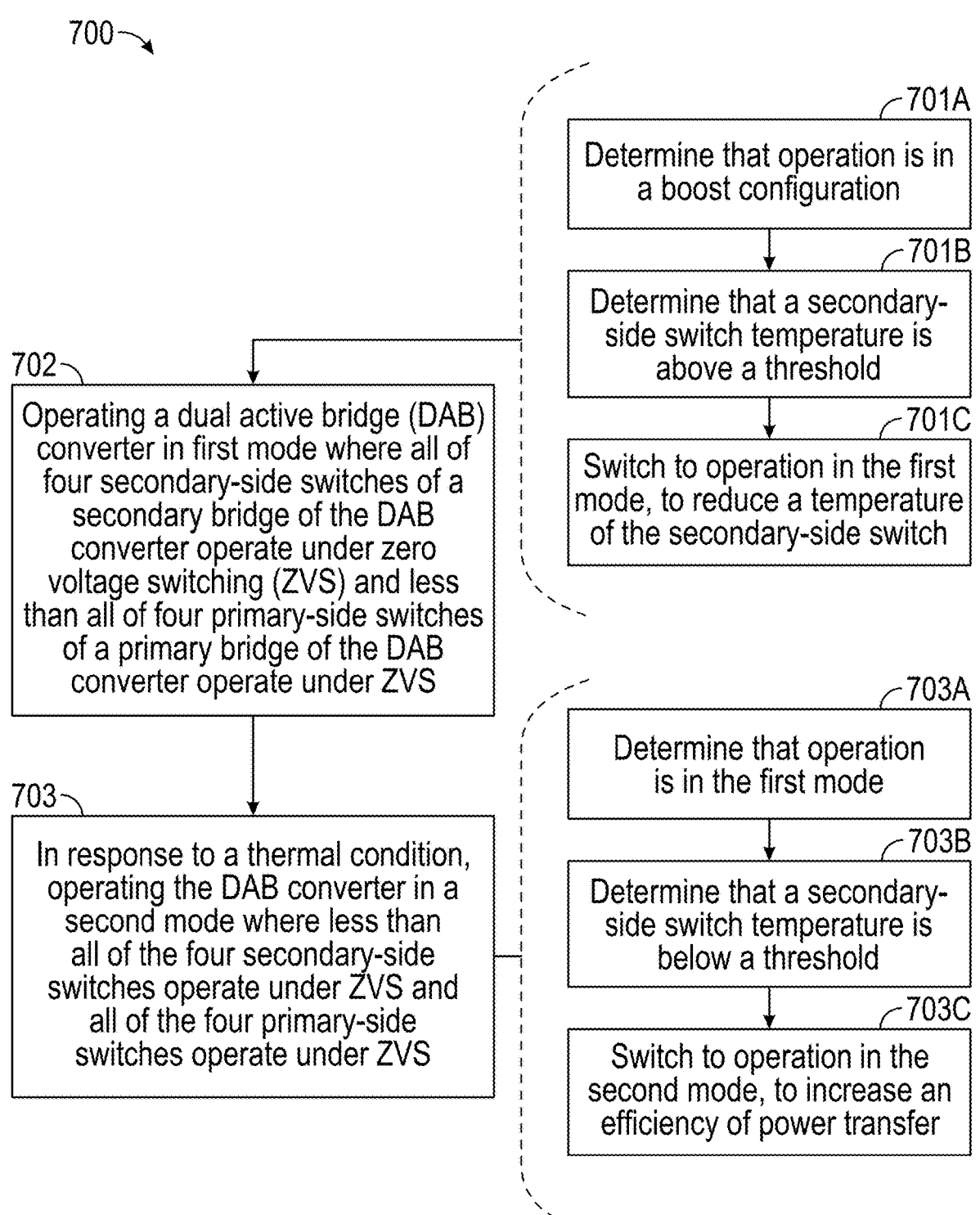

701A
Determine that operation is in a boost configuration

701B
Determine that a secondary-side switch temperature is above a threshold

701C
Switch to operation in the first mode, to reduce a temperature of the secondary-side switch

702
Operating a dual active bridge (DAB) converter in first mode where all of four secondary-side switches of a secondary bridge of the DAB converter operate under zero voltage switching (ZVS) and less than all of four primary-side switches of a primary bridge of the DAB converter operate under ZVS

703
In response to a thermal condition, operating the DAB converter in a second mode where less than all of the four secondary-side switches operate under ZVS and all of the four primary-side switches operate under ZVS

703A
Determine that operation is in the first mode

703B
Determine that a secondary-side switch temperature is below a threshold

703C
Switch to operation in the second mode, to increase an efficiency of power transfer

FIG. 7

DUAL ACTIVE BRIDGE CONTROL FOR THERMAL MANAGEMENT

INTRODUCTION

The present disclosure is directed to systems and methods for controlling a DAB converter. More specifically, the present disclosure is directed to implementing zero-voltage switching (ZVS) schemes for thermal management of a DAB converter.

SUMMARY

A dual active bridge (DAB) converter is a type of power electronics equipment that may perform a DC to DC power conversion. It is beneficial to control a DAB converter such that the temperature of devices (e.g., switches) of the DAB converter stays within a predetermined range in which the switches are intended to operate.

During power conversion using a DAB converter, a zero-voltage switching (ZVS) operation refers to a switch toggle that occurs when the voltage across a switch is zero (e.g., below a predetermined voltage threshold). As used herein, a ZVS scheme may refer to a scheduling of switch toggling during DAB power conversion that achieves many (including as many as possible) ZVS operations. In some power conversion conditions (which may correspond to power conversion modes), it may not be feasible to achieve ZVS on all switches (e.g., all eight switches, four of which correspond to each bridge of the DAB converter, where two of the four correspond to respective legs of the bridge). Switches exposed to non-ZVS operation may heat up because of the non-zero voltage and the corresponding power loss (at least some of which is dissipated as heat) that is associated with the toggling. As such, multiple modes of operation (e.g., including multiple respective ZVS schemes) may be implemented by control circuitry of a DAB converter to maintain the temperature of particular components (or all components) of the DAB converter at or below a given threshold temperature.

In accordance with embodiments of the present disclosure, a system includes four primary-side switches of a primary bridge of a dual active bridge (DAB) converter, four secondary-side switches of a secondary bridge of the DAB converter, and control circuitry configured to operate the DAB converter in a first mode where all of the four secondary-side switches operate under zero voltage switching (ZVS) and less than all of the four primary-side switches operate under ZVS, and in response to a thermal condition, operate the DAB converter in a second mode where less than all of the four secondary-side switches operate under ZVS and all of the four primary-side switches operate under ZVS.

In some embodiments, in the first mode, the DAB converter is operating in a boost configuration where an output voltage of the secondary bridge is greater than an input voltage of the primary bridge.

In some embodiments, in the first mode, none of the four primary-side switches operate under ZVS, and in the second mode, exactly two of the four secondary-side switches operate under ZVS.

In some embodiments, the control circuitry is also configured to determine a temperature of one or more of the four primary-side switches, and determine the thermal condition in response to the temperature exceeding a threshold.

In some embodiments, the control circuitry is also configured to determine a temperature of one or more of the four secondary-side switches, and determine the thermal condition in response to the temperature being below a threshold.

In some embodiments, the control circuitry is also configured to repeatedly switch between operating in the first mode and the secondary mode based on the thermal condition.

In some embodiments, the first mode is associated with a duty cycle, and the control circuitry is also configured to, in the first mode, switch the four secondary-side switches when each respective secondary-side switch is conducting a maximum current of the duty cycle.

In some embodiments, the control circuitry is also configured to, in the first mode, adjust a phase shift delay between one of the primary-side switches and one of the secondary-side switches to adjust output power of the DAB converter.

In accordance with embodiments of the present disclosure, a method includes operating a dual active bridge (DAB) converter in a first mode where all of four secondary-side switches of a secondary bridge of the DAB converter operate under zero voltage switching (ZVS) and less than all of four primary-side switches of a primary bridge of the DAB converter operate under ZVS, and in response to a thermal condition, operating the DAB converter in a second mode where less than all of the four secondary-side switches operate under ZVS and all of the four primary-side switches operate under ZVS.

In some embodiments, operating in the first mode includes operating the DAB converter in a boost configuration where an output voltage of the secondary bridge is greater than an input voltage of the primary bridge.

In some embodiments, in the first mode, none of the four primary-side switches operate under ZVS, and in the second mode, exactly two of the four secondary-side switches operate under ZVS.

In some embodiments, the method also includes determining a temperature of one or more of the four primary-side switches, and determining the thermal condition in response to the temperature exceeding a threshold.

In some embodiments, the method also includes determining a temperature of one or more of the four secondary-side switches, and determining the thermal condition in response to the temperature being below a threshold.

In some embodiments, the method also includes repeatedly switching between operating in the first mode and the secondary mode based on the thermal condition.

In some embodiments, the first mode is associated with a duty cycle, and the method also includes switching the four secondary-side switches when each respective secondary-side switch is conducting a maximum current of the duty cycle.

In some embodiments, in the first mode, the method also includes adjusting a phase shift delay between one of the primary-side switches and one of the secondary-side switches to adjust output power of the DAB converter.

In accordance with embodiments of the present disclosure, a non-transitory computer-readable medium having non-transitory computer-readable instructions encoded thereon that, when executed by a processor, cause the processor to operate a dual active bridge (DAB) converter in a first mode where all of four secondary-side switches of a secondary bridge of the DAB converter operate under zero voltage switching (ZVS) and less than all of four primary-side switches of a primary bridge of the DAB converter operate under ZVS, and in response to a thermal condition, operate the DAB converter in a second mode where less than all of the four secondary-side switches operate under ZVS and all of the four primary-side switches operate under ZVS.

In some embodiments, the instructions, when executed by the processor, also cause the processor to in the first mode, operate none of the four primary-side switches under ZVS, and in the second mode, operate exactly two of the four secondary-side switches under ZVS.

In some embodiments, the instructions, when executed by the processor, also cause the processor to determine a temperature of one or more of the four primary-side switches, and determine the thermal condition in response to the temperature exceeding a threshold.

In some embodiments, the instructions, when executed by the processor, also cause the processor to repeatedly switch between operating in the first mode and the secondary mode based on the thermal condition.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is an illustrative flowchart of a method for operating a DAB converter, in accordance with some embodiments of the present disclosure.

DETAILED DESCRIPTION

Figure 1:
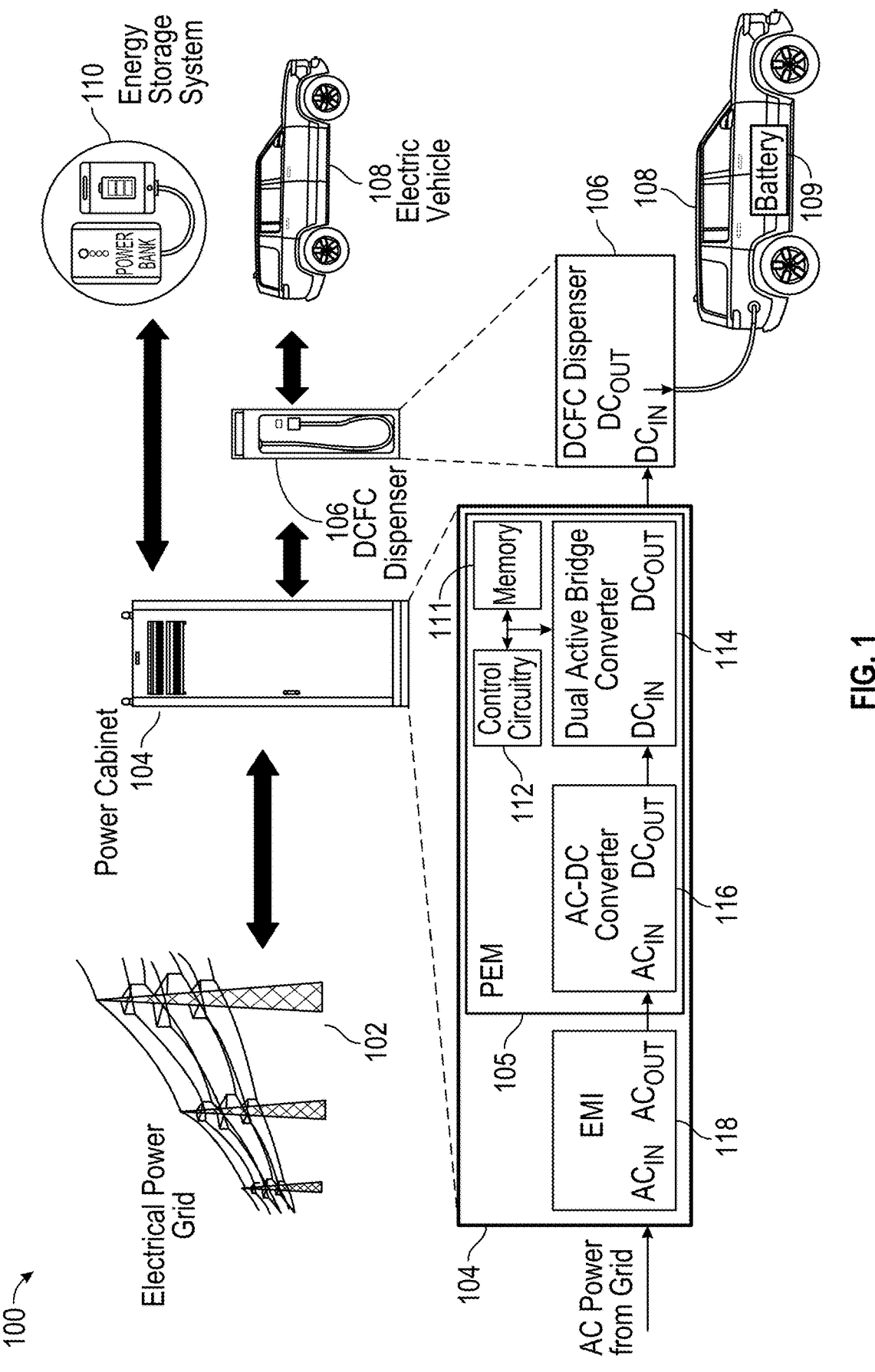
FIG. 1 shows an illustrative block diagram of an electric vehicle charging system including power electronics equipment for providing power to a load and/or an energy storage system, in accordance with some embodiments of the present disclosure.

A DAB converter is a DC to DC power converter that typically includes first and second bridges connected across a transformer. Each of the first and second bridges typically has respective first and second legs of switches, each of which typically has two respective switches. Control circuitry of the DAB converter toggles these switches to transfer an input power to an output power. When a DAB converter operates in boost configuration, a voltage of the output power is greater than a voltage of the input power; when a DAB converter operates in buck configuration, a voltage of the output power is less than a voltage of the input power.

During power conversion using a DAB converter, properties of the transformer and of various circuit elements influence how input power is transferred to output power. It is possible to implement ZVS operations for at least some switches of the DAB converter by selecting particular duty cycles for toggling the switches and by selecting particular phase shifts between when the toggling occurs. Moreover, the particular duty cycles and/or phase shifts may depend on the input and output voltage conditions, as well as the inductance of the transformer and the switching frequency. Thus, implementing ZVS operations may include selecting a primary-side switch duty cycle, secondary-side switch duty cycle, and phase shift between the primary and secondary sides based on a given transformer inductance, operating frequency, and power conversion. Based on these selections, the current waveform passing the transformer may be shaped such that at least some DAB converter switches toggle when the respective current flowing through the switch satisfies conditions for ZVS operation.

During a high-power conversion in a boost configuration, the voltage across respective legs of the secondary-side bridge is greater than the voltage across respective legs of the primary-side bridge. Therefore, more energy loss and heating may occur when toggling secondary-side switches under non-ZVS conditions than when toggling primary-side switches under non-ZVS conditions. However, in some embodiments, achieving a maximum number of ZVS operations (which maximizes power efficiency) during the high-power conversion in the boost configuration may include operating two secondary-side switches under ZVS conditions and four primary-side switches under ZVS conditions. The two non-ZVS secondary-side switches may heat up during these operations. If this heating causes a temperature of the non-ZVS secondary-side switches to surpass a threshold, the output power may be reduced, or a new switching scheme may be implemented to reduce the temperature of the non-ZVS secondary-side switches without substantially reducing the output power.

In accordance with embodiments of the present disclosure, a first DAB converter mode includes toggling all four secondary-side switches under ZVS conditions and toggling zero primary-side switches under ZVS conditions. In some embodiments, the first mode is implemented during a high-power and boost-mode power conversion operation. In some embodiments, the first mode is implemented in response to a thermal condition (e.g., a temperature of a secondary-side switch exceeding a first threshold). A second DAB converter mode includes toggling two of four secondary-side switches under ZVS conditions and toggling all four primary-side switches under ZVS conditions. In some embodiments, the secondary mode is implemented after executing a sufficient number of cycles of the first mode to reduce the temperature of the secondary-side switch to below a second threshold. In some embodiments, control circuitry alternates between operation in the first mode and operation in the second mode to thermally manage the DAB converter without substantially compromising on power conversion efficiency or output power levels.

Accordingly, as described above and as further described in detail below, methods and corresponding systems and computer-readable media are provided for thermally managing a DAB converter during power conversion operations.

FIG. 1 depicts an illustrative block diagram 100 of an electric vehicle charging system including a DAB converter for providing power to a load and/or an ESS, in accordance with some embodiments of the present disclosure. Power is input to the system by electrical power grid 102, which is coupled to power cabinet 104. Power cabinet 104 is coupled to direct current fast charge (DCFC) dispenser 106. Through a direct connection or through dispenser 106, power cabinet 104 ultimately delivers power to at least one of electric vehicle 108 (specifically battery 109 therein) and/or energy storage system (ESS) 110. Power cabinet 104 includes one or more power electronics module (PEM) 105, each of which includes DAB converter 114 as well as memory 111 and control circuitry 112, where memory 111 may include instructions for operating control circuitry 112 to control DAB converter 114 according to the operations described above and as further described below. In some embodiments, DAB converter 114 is electrically isolated from other components of block diagram 100 and is configured for bidirectional flow (e.g., DAB converter 114 can either send power to or receive power from DCFC dispenser 106 or ESS 110). Embodiments of the present disclosure may serve either direction of power flow through DAB converter 114. Additionally included in PEM 105 is AC to DC converter 116, which may convert incoming AC power from the electric grid to a first DC power that can then be converted into a second DC power (e.g., by DAB converter 114) for powering connected loads. In some embodiments, AC to DC converter 116 may convert incoming DC power (e.g., from electric vehicle 108 or ESS 110, through DAB converter 114) to AC power that may be supplied to the electric grid (e.g., to provide grid support) or AC loads (e.g., to provide backup power, grid islanding, supplemental power, any other suitable source of AC power, or any combination thereof).

Figure 2:
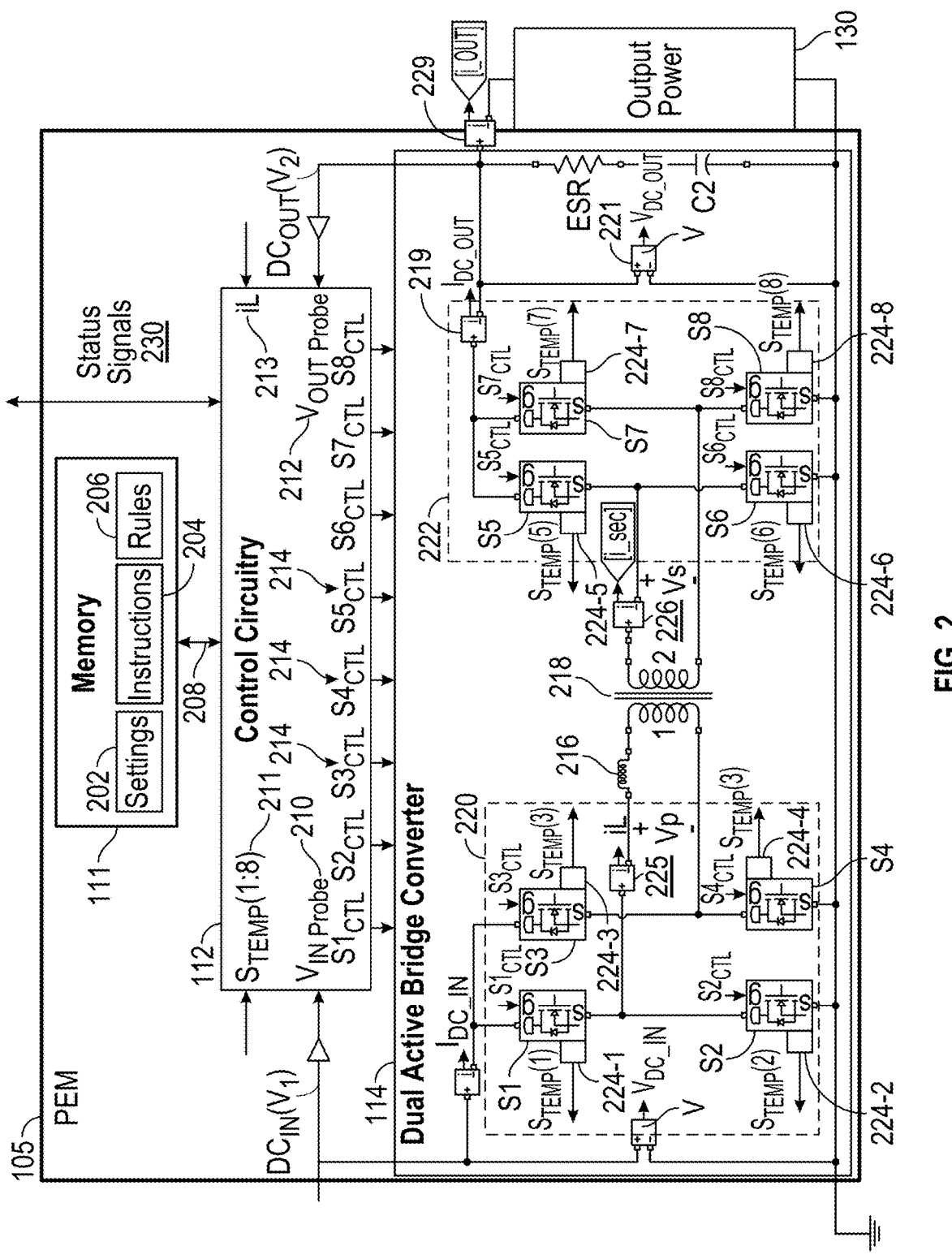
FIG. 2 is an illustrative block diagram showing additional details of some components of power electronics equipment, in accordance with some embodiments of the present disclosure.

FIG. 2 is an illustrative block diagram showing additional details of some components of power electronics equipment, in accordance with some embodiments of the present disclosure. Memory 111 may be an electronic storage device. As referred to herein, the phrase "electronic storage device" or "storage device" may refer to any device for storing electronic data, computer software, or firmware, such as random-access memory, read-only memory, solid state devices, or any other suitable fixed or removable storage devices, and/or any combination thereof. Memory 111 may be used to store various types of instructions, rules, and/or other types of data. For example, memory 111 may include instructions for how to thermally manage any one or more of the components shown in FIG. 2. In some embodiments, the instructions of memory 111 may include one or more ways to operate the DAB converter 114 such that control circuitry can thermally manage any one or more of the components shown in FIG. 2. Furthermore, memory 111 may include rules (e.g., temperature threshold values used for operating various modes and ZVS schemes of the DAB converter, power output ranges applicable to the various ZVS schemes, constraints on various operating parameters including temperature limits, or any combination thereof) for thermally managing the DAB converter 114. In some embodiments, control circuitry 112 executes instructions related to an application stored in memory 111 (e.g., to apply one or more ZVS schemes of DAB converter 114). Specifically, control circuitry 112 may be instructed by the application to perform the functions discussed herein, including toggling switches S1-S8 according to at least two modes of ZVS operation. In some embodiments, any action performed by control circuitry 112 may be based on instructions received from the application. In some embodiments, the application may be implemented as software or a set of executable instructions that may be stored in memory 111 and executed by control circuitry 112.

Memory 111 may store settings 202, instructions 204, and rules 206. Example types of settings 202 may include PEM output settings, DAB control settings (e.g., DAB switch toggling settings), DAB switching schemes (e.g., for implementing ZVS schemes based on thermal conditions), duty cycle settings (e.g., for maintaining switches of the DAB converter below a threshold temperature limit), delay settings (e.g., as may be associated with various modes of the DAB converter), other types of settings, or any combination thereof. In some embodiments, the settings 202 may be configured to vary based on a thermal condition. For example, settings 202 or rules 206 may include details for how to modify a nominal operating procedure (e.g., a ZVS scheme) of DAB converter 114 in response to various temperature threshold-based triggers. Example types of rules 206 include mappings for applying ZVS schemes based on a measured temperature of any one or more of switches S1-S8, other types of information or data, or any combination thereof. In some embodiments, instructions 204 are executed by control circuitry 112 to implement steps of various methods described herein (e.g., based on applicable settings 202 and/or rules 206).

DAB converter 114 includes transformer 218 including a primary bridge winding and a secondary bridge winding, primary-side bridge 220, and secondary-side bridge 222. Primary-side bridge 220 is coupled to a primary side of transformer 218 through input inductor 216, which may be a physical winding, a leakage inductance of the transformer 218, or a combination thereof. Secondary-side bridge 222 is coupled to a secondary side of transformer 218 (which may optionally have an output inductor comparable to inductor 216, despite not being shown in FIG. 2). As used herein, the "primary-side" or "primary bridge" descriptor associated with a DAB converter (e.g., DAB converter 114) may refer to the portion of a DAB converter appearing to the left of a transformer (e.g., transformer 218), and the "secondary-side" or "secondary bridge" descriptor associated with a DAB converter may refer to the portion of a DAB converter appearing to the right of a transformer. It is noted that the "primary" and "secondary" designations of the sides or bridges of the DAB converter are based on the assumption that an input power is provided to the left side of transformer 218, and an output power is provided from the right side of transformer 218. In some embodiments, an input power may be provided to the right side of transformer 218 (e.g., by electric vehicle 108, energy storage system 110, or electric vehicle 332) and an output power may be provided from the left side of transformer 218 (e.g., to electrical power grid 102 or a load connected in place of $V_{in}$ 302), in which case the right side of transformer 218 may be the "primary side" and the left side of transformer 218 may be the "secondary side". As used herein, Vp and Vs refer to the voltage on the primary side of transformer 218 and the voltage on the secondary side of transformer 218, respectively. As used herein, $DC_{IN}(V_1)$ or $V_{dc1}$ refer to an input voltage of the DAB converter and $DC_{OUT}(V_2)$ or $V_{dc2}$ refer to an output voltage of the DAB converter, where the input and output voltages may be associated with the labeled circuit nodes of FIG. 2 and measured with respect to a ground or other reference voltage. DAB converter 114 also includes primary-side switches S1, S2, S3, and S4 located on the primary side of DAB converter 114 and secondary-side switches S5, S6, S7, and S8 located on the secondary side of DAB converter 114. As used herein, a "leg" of a DAB converter bridge refers to a pair of switches that are coupled in series (e.g., switches S1 and S2, S3 and S4, S5 and S6, or S7 and S8). Switches S1, S2, S3, S4, S5, S6, S7, and S8 may be any suitable type of electronic switch, such as a field effect transistor (FET)-based switch, that can be enabled (e.g., switched on/closed, during which current is permitted to be conducted between its source and drain terminal) or disabled (e.g., switched off/open, during which current is effectively prevented from being conducted between its source and drain terminal) by changing a logic level of the control signal provided to its gate terminal, for example from a logic-high state or ON state to a logic-low state or OFF state.

In some embodiments, legs of DAB converter 114 may be toggled (e.g., periodically opened and closed) in response to control signals from control circuitry 112, where such signals may correspond to a desired power output of PEM 105 and/or a desired ZVS scheme. These signals may include particular temporal delays to configure how the switches toggle for ZVS operation or non-ZVS operation. In some embodiments, switches S1-S8 may be wide bandgap (WBG) based power semiconductors, such gallium nitride (GaN) or silicon carbide (SiC) based semiconductors. In some embodiments, switches S1-S8 may include other types of metal-oxide-semiconductor field-effect transistors (MOS-FETs). As shown, each of the switches S1-S8 includes an anti-parallel diode.

In some embodiments, temperature sensors 224-1, 224-2, 224-3, 224-4, 224-5, 224-6, 224-7, and 224-8 (collectively referred to as temperature sensors 224), are coupled to and configured to measure the temperatures of switches S1, S2, S3, S4, S5, S6, S7, and S8, respectively. Temperature sensors 224-1, 224-2, 224-3, 224-4, 224-5, 224-6, 224-7, and 224-8, output to control circuitry 112 signals ($S_{TEMP}(1)$ through $S_{TEMP}(8)$, collectively, $S_{TEMP}(1:8)$) indicating sensed temperatures of switches S1 through S8, respectively. In some embodiments, data from one or more temperature sensors 224-1, 224-2, 224-3, 224-4, 224-5, 224-6, 224-7, and 224-8 may be indicative of voltage levels and/or temperature changes occurring across switches S1-S8. Complete signal paths from output ports $S_{TEMP}(1)$ through $S_{TEMP}(8)$ of temperature sensors 224-1, 224-2, 224-3, 224-4, 224-5, 224-6, 224-7, and 224-8 to temperature input port 211 ($S_{TEMP}(1:8)$) of control circuitry 112 are omitted from FIG. 2 for clarity. Nonetheless, output ports $S_{TEMP}(1)$ through $S_{TEMP}(8)$ of temperature sensors 224-1, 224-2, 224-3, 224-4, 224-5, 224-6, 224-7, and 224-8 are indeed coupled to temperature input port 211 ($S_{TEMP}(1:8)$) of control circuitry 112 through a signal bus or other suitable respective signal paths. In some embodiments, one or more of temperature sensors 224 may be omitted. For example, in some embodiments, only a single temperature sensor may be provided for each leg or for each side of DAB converter 114. In some embodiments, temperature signals can be used as feedback information for the control circuitry 112 to determine a ZVS scheme, how to alternate between two or more ZVS schemes, or any other control scheme of DAB converter 114.

In some embodiments, current sensor 229 is configured to sense output current (i_OUT) of PEM 105 and output to control circuitry 112 a signal indicating the output current as is delivered to provide output power 130. A signal from current sensor 229 may be used to determine a control scheme or ZVS scheme of DAB converter 114 (e.g., how to switch the switches or toggle the legs therein). For example, current sensor 229 may indicate an output power 130 of PEM 105, where the output power may be associated with one or more particular modes or ZVS schemes for operating DAB converter 114. Similarly, current sensor 219 is configured to sense an output current (IDC OUT). Current sensor 219 may be configured the same as current sensor 229, including to be used by control circuitry 112 to determine one or more mode or ZVS scheme of DAB converter 114. In some embodiments, voltage sensor 221 may be coupled in parallel to current sensor 219 to measure an output voltage ($V_{DC\_OUT}$, or $V_{dc2}$) of PEM 105.

In some embodiments, current sensor 226 is configured to sense the current across the secondary side of transformer 218 and to output to control circuitry 112 a signal indicating the secondary-side transformer current. In some embodiments, a signal from current sensor 226 (with or without the signal from current sensor 219) may be used to determine a control scheme or ZVS scheme of the DAB converter 114. In some embodiments, a voltage sensor may be coupled in parallel to current sensor 226 or in another suitable location to measure a transformer voltage. In some embodiments, with or without the signal from voltage sensor 221, such a voltage sensor may be used to determine a corresponding control or ZVS scheme of the DAB converter 114.

In some embodiments, current sensor 225 is configured to sense the current across the primary side of transformer 218 and output to control circuitry 112 a signal indicating the primary current. In some embodiments, a signal from current sensor 225 (with or without the signal from current sensor 219) may be used to determine a corresponding control or ZVS scheme of the DAB converter 114. In some embodiments, a voltage sensor may be coupled in parallel to current sensor 225 or in another suitable location and may be used to determine a corresponding control or ZVS scheme of the DAB converter 114. In some embodiments, voltage sensor 221 or any other voltage or current sensor may be used to determine a corresponding control or ZVS scheme of the DAB converter 114.

Control circuitry 112 includes memory interface port 208, first input port 210 ($V_{IN\ Probe}$), temperature input port 211, second input port 212 ($V_{OUT\ Probe}$), current input port 213, and multiple output ports 214. Control circuitry 112 is configured to transmit and receive instructions, settings, rules, and/or other types of data to and from memory 111 via memory interface port 208. For example, control circuitry 112 may be configured to implement particular control schemes, ZVS schemes, or switch toggling schemes (e.g., for implementing first and second modes of operating a DAB converter based on a thermal condition) based on instructions from memory 111. Control circuitry 112 is configured to sense a temperature of one or more of switches S1-S8 to determine whether one or more thermal conditions are satisfied. Control circuitry 112 is configured to sense a secondary-side output voltage (e.g., $V_{OUT\ Probe}$) via input port 212. In some embodiments, the instructions 204 provided to control circuitry 112 are based on implementing at least two respective ZVS schemes based on a thermal condition.

Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary-side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary-side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG.

2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. In some embodiments, control circuitry 112 is configured to cause switch toggling based on sending control signals (e.g., switch control signals $S1_{CTL}$, $S2_{CTL}$, $S3_{CTL}$, $S4_{CTL}$ of primary-side bridge 220, and/or switch control signals $S5_{CTL}$, $S6_{CTL}$, $S7_{CTL}$, and $S8_{CTL}$ of secondary-side bridge 222) that are provided according to a ZVS scheme that maximizes power transfer efficiency or manages a temperature of one or more elements of the DAB converter 114.

The output of DAB converter 114 is coupled to a load that is configured to receive output power 130. For example, either of electric vehicle 108 or ESS 110 may be charged using output power 130. In response to dynamic power requirements of output power 130, control circuitry 112 may adjust control or switching schemes of DAB converter 114 (e.g., the schemes being various ZVS schemes) to deliver particular levels of dynamic power while managing a temperature of one or more elements of the DAB converter. For example, DAB converter 114 may provide more power (e.g., faster charging) when the state-of-charge of electric vehicle 108 or ESS 110 is low (e.g., less than 5%, 10%, 20%, or any other suitable low state-of-charge) using multiple power output modes, where at least one mode is to maximize power transfer efficiency and at least one other mode is to reduce a temperature of one or more elements of the DAB converter. For another example, the DAB may provide less power (e.g., slower charging) when the state-of-charge of electric vehicle 108 or ESS 110 is high (e.g., greater than 80%, 90%, 95%, or any other suitable high state-of-charge).

In some embodiments, types of switches and/or switch configurations that differ from those shown in FIG. 2 may be utilized (e.g., switches with source and drain terminals located in positions that are the opposite of those shown in FIG. 2, active-high switches that are enabled with a logic-high gate voltage, active-low switches that are enabled with a logic-low gate voltage, or the like). The particular switches and configurations and logic levels shown and described herein are provided as illustrative examples. The principles herein apply similarly to other types of switches and/or switch configurations. The switches relating to the examples described herein are active-high switches that are closed (e.g., turned on) with a logic-high gate voltage and are open (e.g., turned off) with a logic-low gate voltage.

In some embodiments, control circuitry 112 is configured to send status signals 230 (e.g., indicating the temperature of any one or more of switches S1-S8) to communication circuitry (e.g., of PEM 105), an owner or operator of PEM 105, any other suitable recipient, or any combination thereof.

Although a PEM 105 is illustrated and described, it should be understood that DAB converter 114 may be used for any power system that includes handling of direct current (DC) as an input, output, or intermediate power, such as to charge electric vehicle 108 or ESS 110.

Figure 3:
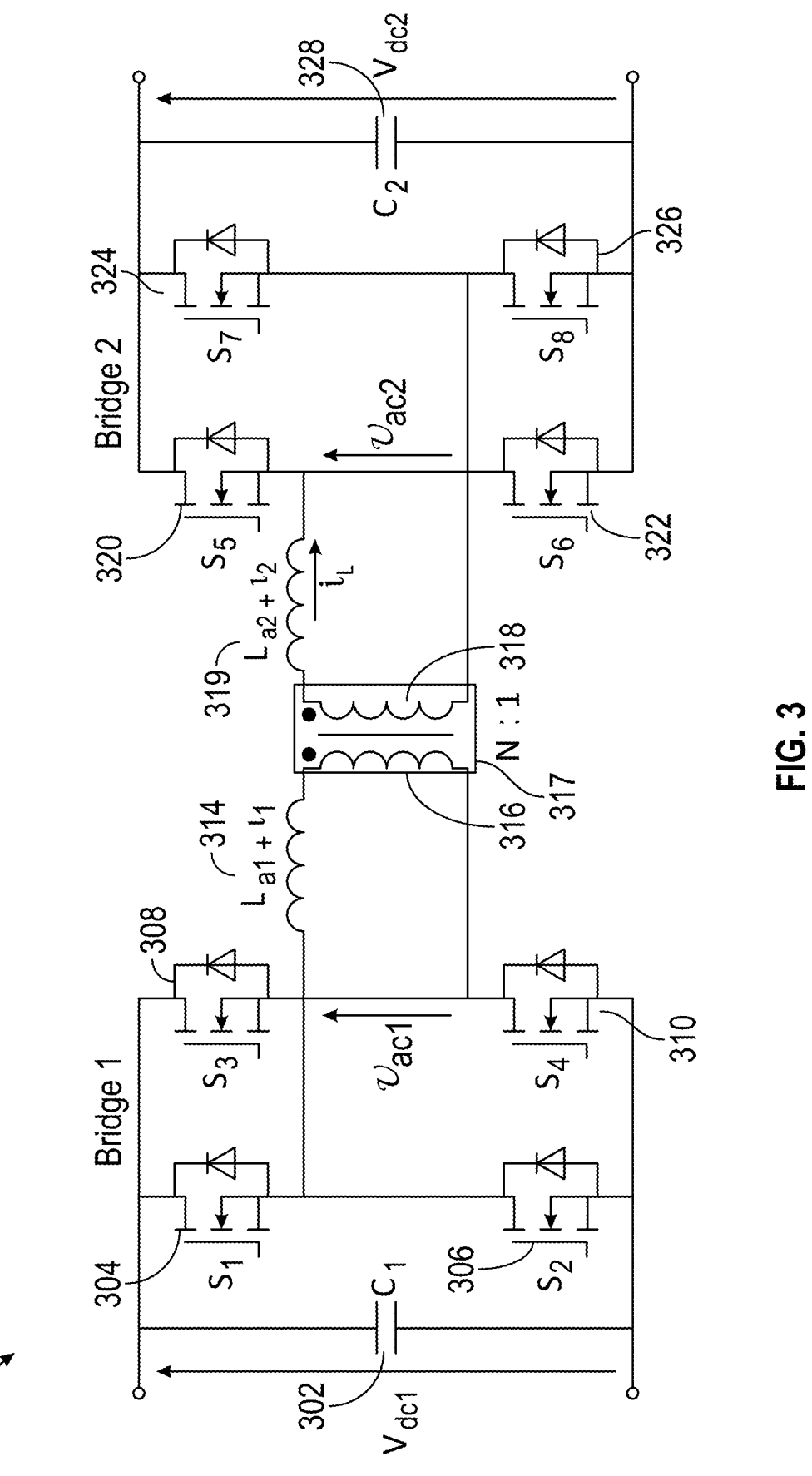
FIG. 3 is an illustrative circuit schematic of a dual active bridge (DAB) converter, in accordance with some embodiments of the present disclosure.

FIG. 3 is an illustrative depiction of a dual active bridge (DAB) converter 300, in accordance with some embodiments of the present disclosure. In some embodiments, elements 304, 306, 308, 310, 320, 322, 324, and 326 may correspond to elements S1, S2, S3, S4, S5, S6, S7, and S8 (of FIG. 2), respectively. In some embodiments, windings 316 and 318 may correspond to the primary bridge winding of transformer 218 and the secondary bridge winding of transformer 218, respectively. In some embodiments, $V_{dc1}$ (measured across capacitor $C_1$ 302) may correspond to $DC_{IN}(V_1)$ power provided to DAB 114 and $V_{dc2}$ (measured across capacitor $C_2$ 328) may correspond to $DC_{OUT}(V_2)$. In some embodiments, inductance 314 may correspond to inductance 216, inductance 319 may correspond to a leakage, magnetizing, and/or winding-based inductance that is in series with winding 318, and transformer 317 may correspond to transformer 218.

A DAB converter (e.g., DAB converter 114 or 300) may transfer DC power from a source coupled in parallel with capacitor 302 to a load coupled in parallel with capacitor 328. In some embodiments, primary-side switches 304, 306, 308, and 310 and secondary-side switches 320, 322, 324, and 326 may be controlled according to a desired level of output power and/or a desired ZVS scheme of the DAB converter.

In some embodiments, control circuitry (e.g., control circuitry 112) of DAB converter 300 is configured to operate the DAB converter in a first mode where all of the four secondary-side switches (e.g., switches 320, 322, 324, and 326) operate under ZVS conditions and less than all of the four primary-side switches (e.g., switches 304, 306, 308, and 310) operate under ZVS conditions. For example, the control circuitry may implement the first mode to reduce a temperature of one or more of the secondary-side switches. In some embodiments, operating less than all of the four primary-side switches under ZVS conditions includes operating all four primary-side switches under non-ZVS conditions. In some embodiments, the control circuitry is also configured to, in response to a thermal condition (e.g., a temperature of one or more of the secondary-side switches reducing below a first threshold, or a temperature of one or more of the primary-side switches increasing beyond a second threshold), operate the DAB converter 300 in a second mode where less than all of the four (e.g., exactly two) secondary-side switches operate under ZVS and all of the four primary-side switches operate under ZVS. For example, the control circuitry may implement the second mode to increase a power conversion efficiency of the DAB converter. In some embodiments, in response to a second thermal condition (e.g., a temperature of one or more of the secondary-side switches increasing beyond a third threshold), the control circuitry may switch from operation in the second mode to operation in the first mode.

Figure 6:
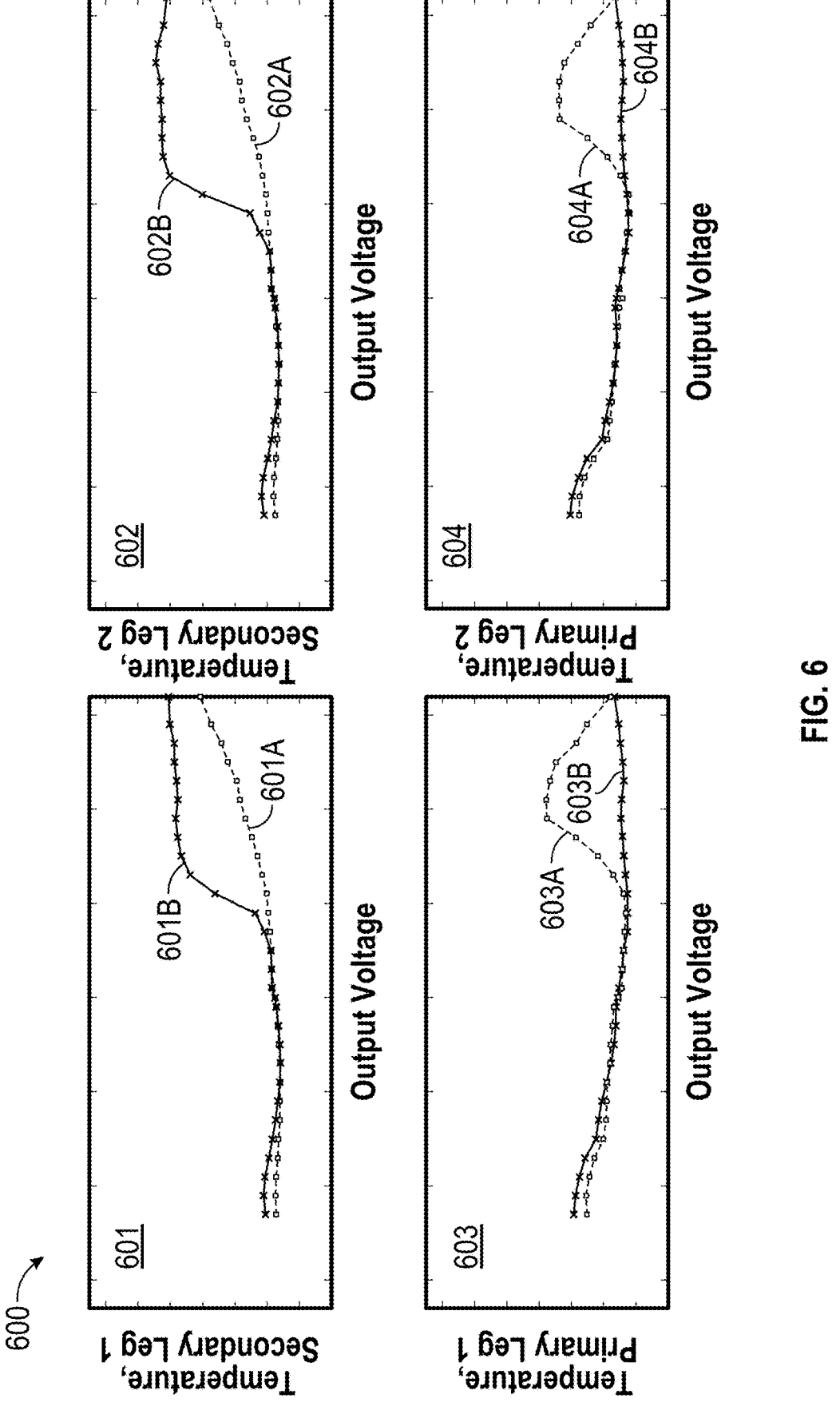
FIG. 6 is an illustrative depiction of switch temperatures associated with the first and second modes of operation, in accordance with some embodiments of the present disclosure.

In some embodiments, in the first mode and/or the second mode, the DAB converter is operating in a boost configuration where an output voltage of the secondary bridge is greater than an input voltage of the primary bridge. Operation in the boost configuration in the first mode may cause a temperature of at least one primary-side switch to increase and a temperature of at least one secondary-side switch to decrease, and operation in the boost configuration in the second mode may cause a temperature of at least one secondary-side switch to increase and a temperature of at least one primary-side switch to decrease (e.g., as shown in FIG. 6).

In some embodiments, the control circuitry (e.g., control circuitry 112) is also configured to repeatedly switch between operating in the first mode and the secondary mode based on one or more of the thermal conditions. For example, the control circuitry may be configured to switch from operation in the first mode to operation in the second mode when the first thermal condition is satisfied, and the control circuitry may be configured to switch from operation in the second mode to operation in the first mode when the second thermal condition is satisfied.

Figure 4:
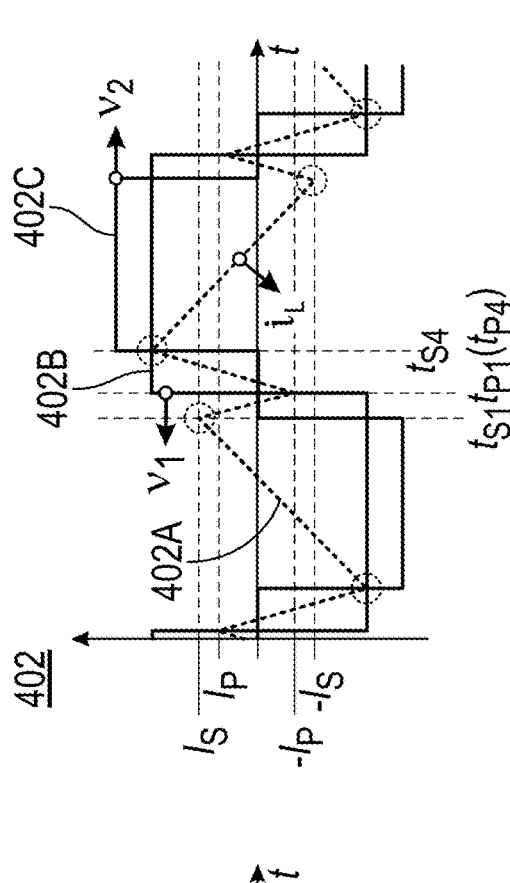
FIG. 4 is an illustrative depiction of a first set of waveforms associated with various operations of a DAB converter, in accordance with some embodiments of the present disclosure.
Figure 4:
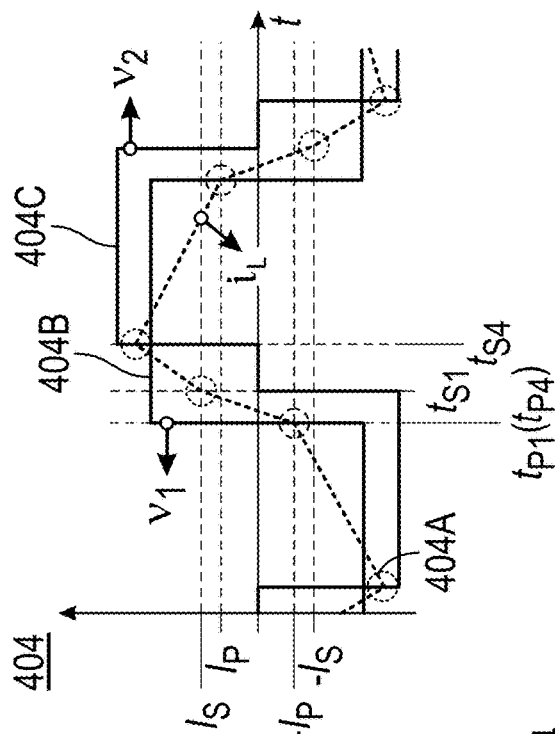
Figure 4:
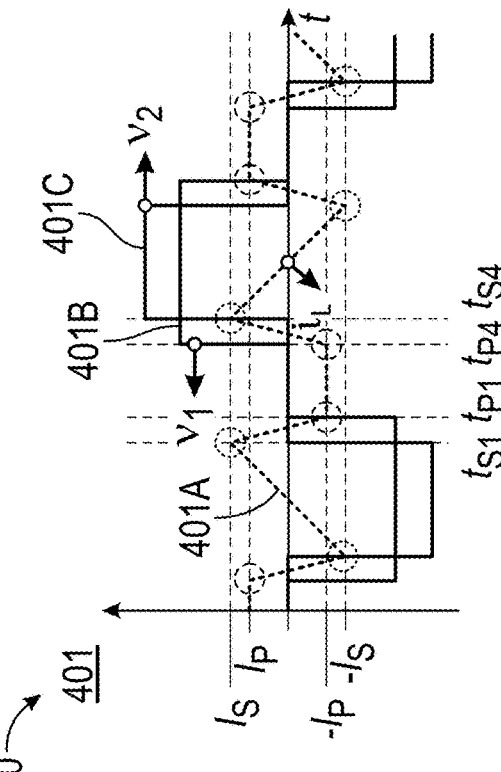
Figure 4:
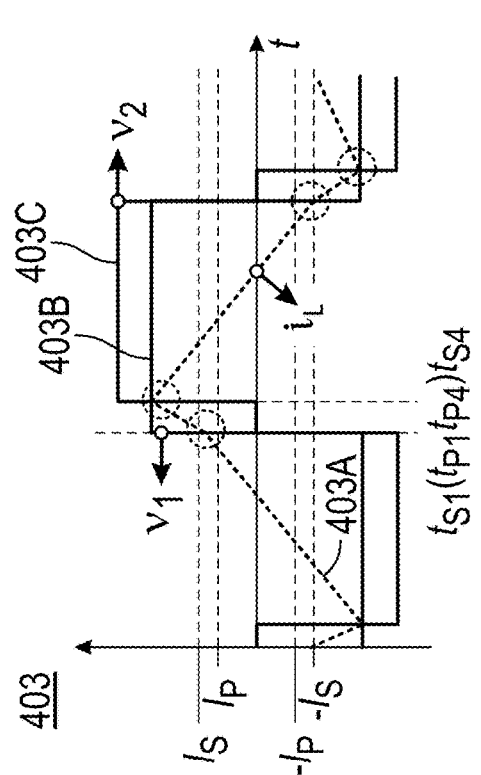

FIG. 4 is an illustrative depiction of a first set of waveforms associated with various operations of DAB converter, where the various operations include the first mode of operation, in accordance with some embodiments of the present disclosure. In FIG. 4, panels 401, 402, 403, and 404 are associated with four ranges of power delivery (e.g., low, medium-low, medium-high, and high, respectively) and corresponding ZVS schemes (e.g., with 8, 4, 4, and 8 switches operating under ZVS conditions, respectively). In some embodiments, a first method of operating a DAB converter includes progressing through panels 401, 402, 403, and 404, in that order. In each of these panels, the vertical axis indicates a signal (e.g., current or voltage) level and the horizontal axis indicates a progression of time. In each of these panels, the waveform denoted "A" (e.g., 401A, 402A, 403A, and 404A) corresponds to the current (e.g., iL, as measured by current sensor 225) across the transformer (e.g., transformer 218 or 317) of a DAB converter (e.g., DAB converter 114 or 300), the waveform denoted "B" (e.g., 401B, 402B, 403B, and 404B) corresponds to the input voltage (e.g., $V_{dc1}$) of a DAB converter, and the waveform denoted "C" (e.g., 401C, 402C, 403C, and 404C) corresponds to the output voltage (e.g., $V_{dc2}$) of a DAB converter. Each of these panels shows more than one duty cycle of operation of the DAB converter.

In each of the panels of FIG. 4, a dashed circle around a point of the current waveform indicates a ZVS condition, where the circles with relatively longer dashes represent toggling of a primary-side switch (e.g., any of switches S1-S4) and the circles with relatively shorter dashes represent toggling of a secondary-side switch (e.g., any of switches S5-S8). The corresponding jump in the input voltage waveform (as is associated with the primary side) or output voltage waveform (as is associated with the secondary side) indicates which side of the DAB converter had a leg of switches toggled (e.g., under ZVS conditions) by the control circuitry (e.g., control circuitry 112). In each of the panels of FIG. 4, the dashed vertical lines indicate timing points associated with ZVS operation, where $t_{S1}$ (where the subscript "S1" refers to a first secondary-side switch) corresponds to a time at which switches S5 and S6 are toggled, $t_{P1}$ (where the subscript "P1" refers to a first primary-side switch) corresponds to a time at which switches S1 and S2 are toggled, $t_{S4}$ (where the subscript "S4" refers to a fourth secondary-side switch) corresponds to a time at which switches S7 and S8 are toggled, and $t_{S4}$ (where the subscript "P4" refers to a fourth primary-side switch) corresponds to a time at which switches S3 and S4 are toggled. In each of the panels of FIG. 4, the dashed horizontal lines indicate current levels associated with ZVS operation, where $I_s$ corresponds to a secondary-side transformer current (e.g., through winding 318) and $I_p$ correspond to a primary-side transformer current (e.g., through winding 316).

In some embodiments, panels 401 (e.g., low power output) and 404 (e.g., high power output) correspond to ranges of power delivery that are compatible with all eight switches of a DAB converter operating under ZVS conditions. However, operation under an intermediate power range (e.g., including the medium-low power output of panel 402 and the medium-high power output of panel 403) may not permit all eight switches of the DAB converter to operate under ZVS conditions. Therefore, either or both of panels 402 or 403 may correspond to the first mode of operation. In some embodiments, power delivery that is consistent with one or both of panels 402 or 403 occurs in a sequence of ramping up from the power delivery of 401 to the power delivery of 404, or vice versa. During this sequence, the power delivery (e.g., the first mode) that is consistent with panel 402 or 403 may alternate with a corresponding power delivery (e.g., the second mode) that is respectively consistent with panel 502 or 503.

The first mode of operating a DAB converter may correspond to the waveforms shown in panel 402 or panel 403. In this first mode, none (or less than all) of the four primary-side switches operate under ZVS, and all of the four secondary-side switches operate under ZVS. In some embodiments, the first mode is associated with a duty cycle, and the control circuitry (e.g., control circuitry 112) implements the first mode by switching the four secondary-side switches when each respective secondary-side switch conducts a maximum current of the duty cycle. In some embodiments, the control circuitry implements the first mode by switching the first leg of secondary-side switches (e.g., switches S5 and S6) when this leg conducts a maximum current of the duty cycle, and switches the second leg of the secondary-side switches (e.g., switches S7 and S8) after a suitable delay. In other words, the control circuitry may cause toggling to occur such that the current at time $t_{S1}$ is equal to $I_s$. In some embodiments, the first and second legs of the primary-side switches are toggled after suitable delays with respect to the toggling of the first and second legs of the secondary-side switches, respectively.

The switches associated with each circled ZVS condition of FIG. 4 are provided as follows. In panel 401, with reference to the circled ZVS conditions from left to right, the switches being toggled are S3, S7, S5, S1, S4, S8, S6, S2, S3, and S7. Note that the second toggling of switches S3 and of S7 are part of a new duty cycle. Thus, there are eight ZVS switching operations in each duty cycle of panel 401, each associated with one switch, such that all switches S1-S8 are toggled under ZVS conditions. In panel 402, with reference to the circled ZVS conditions from left to right, the switches being toggled are S7, S5, S8, S6, and S7. Note that the second toggling of switch S7 is part of a new duty cycle. Thus, there are four ZVS switching operations in each duty cycle of panel 402, each associated with one switch, such that only switches S5-S8 are toggled under ZVS conditions. In panel 403, with reference to the circled ZVS conditions from left to right, the switches being toggled are S5, S8, S6, and S7. Thus, there are four ZVS switching operations in each duty cycle of panel 403, each associated with one switch, such that only switches S5-S8 are toggled under ZVS conditions. In panel 404, with reference to the circled ZVS conditions from left to right, the switches being toggled are S7, S1/S4 (i.e., these switches are toggled at the same time), S5, S8, S2/S3, S6, and S7. Note that the second toggling of switch S7 is part of a new duty cycle. Thus, there are six ZVS switching operations in each duty cycle of panel 404, four of which are associated with one switch and two of which are associated with two switches, such that all switches S1-S8 are toggled under ZVS conditions.

In some embodiments, the control circuitry (e.g., control circuitry 112) is also configured to, in the first mode, adjust a phase shift delay between one of the primary-side switches and one of the secondary-side switches to adjust an output power of the DAB converter.

Figure 5:
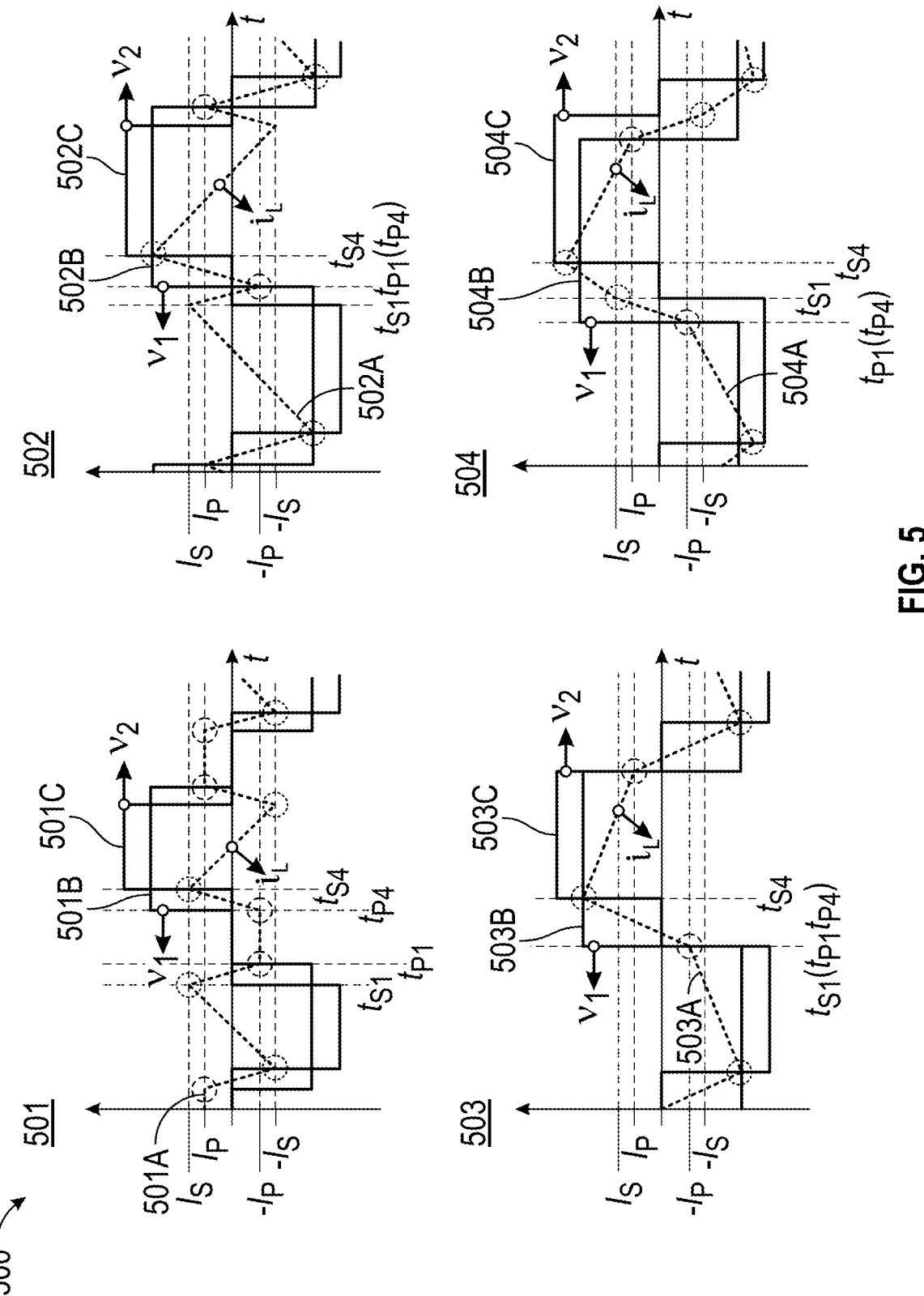
FIG. 5 is an illustrative depiction of a second set of waveforms associated with various operations of a DAB converter, in accordance with some embodiments of the present disclosure.

FIG. 5 is an illustrative depiction of a second set of waveforms associated with various operations of DAB converter, where the various operations include the second mode of operation, in accordance with some embodiments of the present disclosure. In FIG. 5, panels 501, 502, 503, and 504 are associated with four ranges of power delivery (e.g., low, medium-low, medium-high, and high, respectively) and corresponding ZVS schemes (e.g., with 8, 6, 6, and 8 switches operating under ZVS conditions, respectively). In some embodiments, a second method of operating a DAB converter includes progressing through panels 501, 502, 503, and 504, in that order. In each of these panels, the vertical axis indicates a signal (e.g., current or voltage) level and the horizontal axis indicates a progression of time. In each of these panels, the waveform denoted "A" (e.g., 501A, 502A, 503A, and 504A) corresponds to the current (e.g., iL, as measured by current sensor 225) across the transformer (e.g., transformer 218 or 317) of a DAB converter (e.g., DAB converter 114 or 300), the waveform denoted "B" (e.g., 501B, 502B, 503B, and 504B) corresponds to the input voltage (e.g., $V_{dc1}$) of a DAB converter, and the waveform denoted "C" (e.g., 501C, 502C, 503C, and 504C) corresponds to the output voltage (e.g., $V_{dc2}$) of a DAB converter. Each of these panels shows more than one duty cycle of operation of the DAB converter.

In each of the panels of FIG. 5, a dashed circle around a point of the current waveform indicates a ZVS condition, where the circles with relatively longer dashes represent toggling of a primary-side switch (e.g., any of switches S1-S4) and the circles with relatively shorter dashes represent toggling of a secondary-side switch (e.g., any of switches S5-S8). The corresponding jump in the input voltage waveform (as is associated with the primary side) or output voltage waveform (as is associated with the secondary side) indicates which side of the DAB converter had a leg of switches toggled (e.g., under ZVS conditions) by the control circuitry (e.g., control circuitry 112). In each of the panels of FIG. 5, the dashed vertical lines indicate timing points associated with ZVS operation, where $t_{S1}$ corresponds to a time at which switches S5 and S6 are toggled, $t_{P1}$ corresponds to a time at which switches S1 and S2 are toggled, $t_{S4}$ corresponds to a time at which switches S7 and S8 are toggled, and $t_{S4}$ corresponds to a time at which switches S3 and S4 are toggled. In each of the panels of FIG. 5, the dashed horizontal lines indicate current levels associated with ZVS operation, where $I_s$ corresponds to a secondary-side transformer current (e.g., through winding 318) and $I_p$ correspond to a primary-side transformer current (e.g., through winding 316).

The switches associated with each circled ZVS condition of FIG. 5 are provided as follows. The ZVS conditions of panel 501 and 504 are the same as those of panel 401 and 404. In panel 502, with reference to the circled ZVS conditions from left to right, the switches being toggled are S7, S1/S4 (i.e., these switches are toggled at the same time), S8, S2/S3, and S7. Note that the second toggling of switch S7 is part of a new duty cycle. Thus, there are four ZVS switching operations in each duty cycle of panel 502, two of which are associated with two switches and two of which are associated with one switch, such that only switches S1-S4, S7, and S8 are toggled under ZVS conditions. In panel 503, with reference to the circled ZVS conditions from left to right, the switches being toggled are S7, S1/S4, S8, S2/S3, and S7. Note that the second toggling of switch S7 is part of a new duty cycle. Thus, there are four ZVS switching operations in each duty cycle of panel 503, two of which are associated with two switches and two of which are associated with one switch, such that only switches S1-S4, S7, and S8 are toggled under ZVS conditions.

In some embodiments, panels 501 and 504 respectively correspond to panels 401 and 404. Either or both of panels 502 or 503 may correspond to the second mode of operation. In some embodiments, power delivery that is consistent with one or both of panels 502 or 503 occurs in a sequence of ramping up from the power delivery of 501 to the power delivery of 504, or vice versa. During this sequence, the power delivery (e.g., the second mode) that is consistent with panel 502 or 503 may respectively alternate with a corresponding power delivery (e.g., the first mode) that is consistent with panel 402 or 403.

As mentioned, the first mode may reduce a temperature of one or more secondary-side switches (e.g., due to operating all secondary-side switches under ZVS conditions), whereas the second mode may improve a power transfer efficiency compared to the first mode (e.g., due to operating a greater number of switches under ZVS conditions). Therefore, control circuitry (e.g., control circuitry 112) may alternate (e.g., repeatedly switch) between operation in the first mode (e.g., consistent with panel 402 or panel 403) and operation in the second mode (e.g., consistent with the corresponding panel 502 or panel 503) to maintain a desired level of power conversion efficiency and a desired level of power output while managing temperatures of the switches of the primary-side and secondary-side bridges.

In the second mode of operating the DAB converter, all of the four primary-side switches operate under ZVS, and two (or less than all) of the four secondary-side switches operate under ZVS. In some embodiments, the second mode is associated with a duty cycle, and the control circuitry (e.g., control circuitry 112) implements the second mode by switching the four secondary-side switches when each respective primary-side switch conducts a minimum current of the duty cycle. In some embodiments, the control circuitry implements the first mode by switching the first leg of primary-side switches (e.g., switches S1 and S2) when this leg conducts a minimum current of the duty cycle, and switches the second leg of the primary-side switches (e.g., switches S3 and S4) after a suitable delay. In other words, the control circuitry causes toggling to occur such that the current at time $t_{P1}$ and the current at time $t_{P4}$ are equal to $-I_P$. In some embodiments, the first and second legs of the secondary-side switches are toggled after suitable delays with respect to the toggling of the first and second legs of the primary-side switches, respectively.

It is noted that the waveforms and ZVS operations differ between panels 402 and 502, and between panels 403 and 503, as per the different duty cycles and/or phase shifts associated with the first and second modes of operation. To highlight these differences, additional details of panels 402, 403, 502, and 503 are provided as follows.

In panel 402, the switching times associated with the toggling of switches S5 and S6 are fixed to be under ZVS conditions, which causes the absolute value of the transformer current 402A to reduce at the non-ZVS switching times associated with the toggling of switches S1/S4 and S2/S3. In panel 403, the ZVS switching times associated with the toggling of switches S5 and S6 remain fixed, and the transformer current 403A at the non-ZVS switching times associated with the toggling of switches S1/S4 and S2/S3 changes direction (e.g., the current goes from negative to positive, or vice versa). After this change in current direction, the absolute value of the transformer current 403A at the non-ZVS switching times associated with the toggling of switches S1/S4 and S2/S3 increases until, as shown in panel 404, the current increase is such that all eight switches can return to toggling under ZVS conditions.

In panel 502, the switching times associated with the toggling of switches S1/S4 and S2/S3 are fixed to be under ZVS conditions, which causes the absolute value of the transformer current 502A to reduce at the non-ZVS switching times associated with the toggling of switches S5 and S6. In panel 503, the ZVS switching times associated with the toggling of S1/S4 and S2/S3 remain fixed, and the transformer current 503A at the non-ZVS switching times associated with the toggling of switches S5 and S6 changes direction (e.g., the current goes from negative to positive, or vice versa). After this change in current direction, the absolute value of the transformer current 503A at the non-ZVS switching times associated with the toggling of switches S5 and S6 increases until, as shown in panel 504, the current increase is such that all eight switches can regain ZVS operations.

With reference to the first method of operating a DAB converter described in connection with panels 401-404 and the second method of operating a DAB converter described in connection with panels 501-504, operating a DAB converter may include alternating between the first method and the second method based on a thermal condition (e.g., a temperature of at least one switch of the DAB converter). For example, operating the DAB converter may include implementing the first method (e.g., that increases the temperature of at least one primary side switch) until a temperature of a primary side switch increases above a first threshold, implementing the second method (e.g., that reduces the temperature of at least one primary side switch) until the temperature of the primary side switch decreases below a second threshold, and toggling between these implementations based on the first and second thresholds. Similarly, the first method may reduce a temperature of at least one secondary side switch, the second method may increase the temperature of at least one secondary side switch, and the first and second temperature thresholds may be based on the temperature of the secondary side switch.

FIG. 6 is an illustrative depiction 600 of switch temperatures associated with the first and second modes of operation, in accordance with some embodiments of the present disclosure. As labeled, panel 601 shows the temperature of the switches (e.g., switches S5 and S6) of the first secondary-side leg as a function of the output voltage (e.g., of a DAB converter); panel 601 shows the temperature of the switches (e.g., switches S7 and S8) of the second secondary-side leg as a function of the output voltage, panel 603 shows the temperature of the switches (e.g., switches S1 and S2) of the first primary-side leg as a function of the output voltage; and panel 604 shows the temperature of the switches (e.g., switches S3 and S4) of the second primary-side leg as a function of the output voltage. In each of panels 601, 602, 603, and 604, the profile denoted "A" (e.g., 601A, 602A, 603A, and 604A) corresponds to a temperature profile associated with the first mode of operation (e.g., with exactly 4 switches operating under ZVS conditions), and the profile denoted "B" (e.g., 601B, 602B, 603B, and 604B) corresponds to a temperature profile associated with the second mode of operation (e.g., with exactly 6 switches operating under ZVS conditions).

As shown in panels 601 and 602, the first mode of operation results in a lower average temperature of the secondary leg switches than occurs during the second mode of operation. This occurs because the first mode implements ZVS conditions for all four secondary-side devices, whereas the second mode implements ZVS conditions for only two secondary-side devices. As shown in panels 603 and 604, the first mode of operation results in higher temperatures of the primary leg switches than occur during the second mode of operation. This occurs because the first mode implements ZVS conditions for zero (or less than four) of the primary-side switches, whereas the second mode implements ZVS conditions for all four of the primary-side switches.

In some embodiments, the control circuitry (e.g., control circuitry 112) is configured to monitor (e.g., based on a signal from one or more temperature sensor 224) the temperatures of one or more of the legs described in FIG. 6 and to determine the thermal condition (e.g., for implementing the first mode or implementing the second mode) in response to the temperature being above or below a particular threshold (e.g., that is stored in memory 111).

FIG. 7 is an illustrative flowchart of a method 700 for operating a DAB converter, in accordance with some embodiments of the present disclosure. In some embodiments, method 700 is executed by control circuitry 112 (e.g., based on information stored in memory 111 and based on a signal from one or more temperature sensor 224) of DAB converter 114.

Method 700 includes, at 702, operating a dual active bridge (DAB) converter in a first mode (e.g., corresponding to either of panel 402 or panel 403) where all of four secondary-side switches (e.g., switches S5-S8, as shown in FIGS. 2-3) of a secondary bridge of the DAB converter operate under zero voltage switching (ZVS) and less than all of four (e.g., zero) primary-side switches (e.g., switches S1-S4, as shown in FIGS. 2-3) of a primary bridge of the DAB converter operate under ZVS.

In some embodiments, the operations at 702 follow the optional suboperations at 701A, 701B, and 701C. At 701A, control circuitry determines that the DAB converter is operating in a boost configuration. At 701B, control circuitry determines that one or more secondary-side switch temperature is above a threshold. At 701C, control circuitry switches to operation in the first mode, to reduce a temperature of the one or more secondary-side switch. In some embodiments, 702 begins when the control circuitry switches to operation in the first mode from operation in the second mode or from operation at a different range of power delivery (with reference to the ranges of power delivery described in connection with FIGS. 4-5).

Method 700 includes, at 703, in response to a thermal condition (e.g., a temperature of one or more of the four secondary-side switches being below a threshold, or a temperature of one or more of the four primary-side switches being above a threshold), operating the DAB converter in a second mode where less than all (e.g., exactly two) of the four secondary-side switches operate under ZVS and all of the four primary-side switches operate under ZVS.

In some embodiments, the operations at 703 include the suboperations at 703A, 703B, and 703C. At 703A, control circuitry determines that the DAB converter is operating in the first mode. At 703B, control circuitry determines that one or more secondary-side switch temperature is below a threshold (e.g., the one or more (e.g., all four) secondary-side switch has sufficiently cooled). At 703C, control circuitry switches to operation in the second mode, to increase an efficiency of power transfer. In some embodiments, the increased power transfer efficiency at 703C is associated with an increase in temperature of at least one secondary-side switch.

In some embodiments, method 700 also includes repeatedly switching between the operations at 702 and 703. In some embodiments, a frequency of the repeated switching is based on the temperature of at least one secondary-side switch, the temperature of at least one primary-side switch, or both. For example, after operating the DAB converter in the first mode (e.g., according to the operations at 702), if the temperature of at least one secondary-side switch reduces below a first threshold and/or the temperature of at least one primary-side switch increases above a second threshold, the control circuitry may switch to operation in the second mode (e.g., according to the operations at 703). Continuing the example, after operating the DAB converter in the second mode, if the temperature of at least one secondary-side switch increases above a third threshold (which may be equal to the second threshold) and/or the temperature of at least one primary-side switch reduces below a fourth threshold (which may be equal to the first threshold), the control circuitry may switch to operation in the first mode (e.g., according to the operations at 701A-C and/or 702). It is noted that the repeated switching may include symmetric (e.g., the duration of each interval of operation in the first mode is substantially equivalent to the duration of each interval of operation in the second mode) switching or may include asymmetric (e.g., the duration of each interval of operation in the first mode is not substantially equivalent to the duration of each interval of operation in the second mode) switching. In some embodiments, the repeated switching frequency, the duration of each interval of operation in the first mode, the duration of each interval of operation in the second mode, or any combination thereof are set by the control circuitry based on the one or more thermal condition. In some embodiments, the repeated switching frequency, the duration of each interval of operation in the first mode, the duration of each interval of operation in the second mode, or any combination thereof are dynamically adjusted by the control circuitry based on the one or more thermal condition.

Thus it has been shown that systems, methods, and computer-readable media for thermal management of a DAB converter have been provided.

The processes described above are intended to be illustrative and not limiting. One skilled in the art would appreciate that the steps of the processes described herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A system comprising:
four primary-side switches of a primary bridge of a dual active bridge (DAB) converter;
four secondary-side switches of a secondary bridge of the DAB converter; and
control circuitry configured to:
operate the DAB converter in a first mode where all of the four secondary-side switches operate under zero voltage switching (ZVS) and less than all of the four primary-side switches operate under ZVS; and
in response to a thermal condition, operate the DAB converter in a second mode where less than all of the four secondary-side switches operate under ZVS and all of the four primary-side switches operate under ZVS.

2. The system of claim 1, wherein in the first mode, the DAB converter is operating in a boost configuration where an output voltage of the secondary bridge is greater than an input voltage of the primary bridge.

3. The system of claim 1, wherein:
in the first mode, none of the four primary-side switches operate under ZVS; and
in the second mode, exactly two of the four secondary-side switches operate under ZVS.

4. The system of claim 1, wherein the control circuitry is further configured to:
determine a temperature of one or more of the four primary-side switches; and
determine the thermal condition in response to the temperature exceeding a threshold.

5. The system of claim 1, wherein the control circuitry is further configured to:
determine a temperature of one or more of the four secondary-side switches; and
determine the thermal condition in response to the temperature being below a threshold.

6. The system of claim 1, wherein the control circuitry is further configured to repeatedly switch between operating in the first mode and the secondary mode based on the thermal condition.

7. The system of claim 1, wherein:
the first mode is associated with a duty cycle, and
the control circuitry is further configured to, in the first mode, fix respective times in the duty cycle at which two secondary-side switches are toggled, wherein the fixed respective times cause the two secondary-side switches to maintain operation under ZVS while an output power of the DAB converter increases.

8. The system of claim 1, wherein the control circuitry is further configured to, in the first mode, adjust a phase shift delay between one of the primary-side switches and one of the secondary-side switches to adjust output power of the DAB converter.

9. A method comprising:
operating a dual active bridge (DAB) converter in a first mode where all of four secondary-side switches of a secondary bridge of the DAB converter operate under zero voltage switching (ZVS) and less than all of four primary-side switches of a primary bridge of the DAB converter operate under ZVS; and
in response to a thermal condition, operating the DAB converter in a second mode where less than all of the four secondary-side switches operate under ZVS and all of the four primary-side switches operate under ZVS.

10. The method of claim 9, wherein operating in the first mode comprises operating the DAB converter in a boost configuration where an output voltage of the secondary bridge is greater than an input voltage of the primary bridge.

11. The method of claim 9, wherein:
in the first mode, none of the four primary-side switches operate under ZVS; and
in the second mode, exactly two of the four secondary-side switches operate under ZVS.

12. The method of claim 9, further comprising:
determining a temperature of one or more of the four primary-side switches; and
determining the thermal condition in response to the temperature exceeding a threshold.

13. The method of claim 9, further comprising:
determining a temperature of one or more of the four secondary-side switches; and
determining the thermal condition in response to the temperature being below a threshold.

14. The method of claim 9, further comprising repeatedly switching between operating in the first mode and the secondary mode based on the thermal condition.

15. The method of claim 9, wherein the first mode is associated with a duty cycle, the method further comprising fixing respective times in the duty cycle at which two secondary-side switches are toggled, wherein the fixed respective times cause the two secondary-side switches to maintain operation under ZVS while an output power of the DAB converter increases.

16. The method of claim 9, further comprising, in the first mode, adjusting a phase shift delay between one of the primary-side switches and one of the secondary-side switches to adjust output power of the DAB converter.

17. A non-transitory computer-readable medium having non-transitory computer-readable instructions encoded thereon that, when executed by a processor, cause the processor to:

operate a dual active bridge (DAB) converter in a first mode where all of four secondary-side switches of a secondary bridge of the DAB converter operate under zero voltage switching (ZVS) and less than all of four primary-side switches of a primary bridge of the DAB converter operate under ZVS; and in response to a thermal condition, operate the DAB converter in a second mode where less than all of the four secondary-side switches operate under ZVS and all of the four primary-side switches operate under ZVS.

18. The non-transitory computer-readable medium of claim 17, wherein the instructions, when executed by the processor, further cause the processor to:

in the first mode, operate none of the four primary-side switches under ZVS; and in the second mode, operate exactly two of the four secondary-side switches under ZVS.

19. The non-transitory computer-readable medium of claim 17, wherein the instructions, when executed by the processor, further cause the processor to:

determine a temperature of one or more of the four primary-side switches; and determine the thermal condition in response to the temperature exceeding a threshold.

20. The non-transitory computer-readable medium of claim 17, wherein the instructions, when executed by the processor, further cause the processor to:

repeatedly switch between operating in the first mode and the secondary mode based on the thermal condition.

* * * * *